United States Patent
Mehring et al.

(10) Patent No.: US 10,755,137 B2
(45) Date of Patent: *Aug. 25, 2020

(54) PHOTO ANALYTICS CALIBRATION

(71) Applicant: Zest Labs, Inc., San Jose, CA (US)

(72) Inventors: Peter A. Mehring, Los Altos, CA (US); Thomas C. Reese, Ellicott City, MD (US)

(73) Assignee: Zest Labs, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/362,305

(22) Filed: Mar. 22, 2019

(65) Prior Publication Data
US 2019/0220686 A1 Jul. 18, 2019

Related U.S. Application Data

(63) Continuation of application No. 15/205,296, filed on Jul. 8, 2016.

(60) Provisional application No. 62/190,215, filed on Jul. 8, 2015.

(51) Int. Cl.
*G06K 9/46* (2006.01)
*G06Q 10/08* (2012.01)

(52) U.S. Cl.
CPC .......... *G06K 9/4652* (2013.01); *G06Q 10/08* (2013.01); *G06Q 10/087* (2013.01); *G06K 2209/17* (2013.01)

(58) Field of Classification Search
None
See application file for complete search history.

(56) References Cited

U.S. PATENT DOCUMENTS

| 7,455,225 | B1 | 11/2008 | Hadfield et al. | |
| 9,042,967 | B2* | 5/2015 | Dacosta | A61B 5/0059 600/476 |
| 10,060,798 | B1* | 8/2018 | Riscalla | G01J 5/0265 |
| 2005/0055287 | A1* | 3/2005 | Schmidtberg | G06Q 10/0833 705/28 |
| 2006/0283931 | A1* | 12/2006 | Polli | G09F 3/00 235/375 |
| 2008/0294488 | A1* | 11/2008 | Gupta | G06Q 10/087 705/7.26 |
| 2011/0078089 | A1* | 3/2011 | Hamm | G06Q 10/0833 705/333 |
| 2013/0034908 | A1* | 2/2013 | Barstis | G01N 21/78 436/43 |

(Continued)

OTHER PUBLICATIONS

Katrina et al ( Using color quality to indicate ripeness in fruits : creating a better product with spectrophotometric technology) Apr. 24, 2015 (Year: 2015).*

(Continued)

*Primary Examiner* — Nancy Bitar
(74) *Attorney, Agent, or Firm* — Zilka-Kotab, P.C.

(57) ABSTRACT

A computer-implemented method for routing a food product using an image of the food product, according to one embodiment, includes receiving an image of a food product, receiving an environmental condition on or near the food product, evaluating the food product using the image and the environmental condition, and determining a delivery destination for the food product based at least in part on the evaluation of the food product.

18 Claims, 3 Drawing Sheets

(56) References Cited

U.S. PATENT DOCUMENTS

| | | | |
|---|---|---|---|
| 2013/0036068 A1* | 2/2013 | Smith | G06Q 10/083 705/332 |
| 2014/0147015 A1* | 5/2014 | Bajema | G06T 7/0004 382/110 |
| 2014/0180953 A1* | 6/2014 | Westcott | A23B 7/148 705/332 |
| 2014/0288995 A1 | 9/2014 | Huff et al. | |
| 2015/0032265 A1* | 1/2015 | Herring | F24F 11/30 700/276 |
| 2015/0262121 A1* | 9/2015 | Riel-Dalpe | G06Q 10/08 705/15 |
| 2017/0184551 A1 | 6/2017 | Bai et al. | |

OTHER PUBLICATIONS

Non-Final Office Action from U.S. Appl. No. 16/362,401, dated Jun. 20, 2019.
Final Office Action from U.S. Appl. No. 16/361,042, dated Feb. 3, 2020.
Advisory Action from U.S. Appl. No. 16/360,942, dated Mar. 6, 2020.
Non-Final Office Action from U.S. Appl. No. 16/362,401, dated Dec. 11, 2019.

* cited by examiner

PHOTO ANALYTICS CALIBRATION

FIELD OF THE INVENTION

The present invention relates to use of photo analytics, and more particularly, this invention relates to use of photo analytics to evaluate a state of a product.

BACKGROUND

The use of photo analytics offers significant advantages for food quality assurance, as much of the current practice includes visual inspection. The challenge for visual inspection of fresh food is twofold: first, the inspector must be highly trained to identify the visual feedback, and interpret according to the specific of the food type and possible variety specifics, and second, the inspector needs to be as objective as possible to enable consistent evaluation across different inspectors potentially in different environments. The use of photo analytics can improve upon inspector visual inspection, by performing consistent evaluations from images of food products. However, the image capture may not be consistent due to a number of potential factors, such as (but not limited to) lighting of the food product, camera filters or optical biases, background color influences, air borne particle interference, non-visible light variability, the type of camera used, and so on.

SUMMARY

A computer-implemented method for routing a food product using an image of the food product, according to one embodiment, includes receiving an image of a food product, receiving an environmental condition on or near the food product, evaluating the food product using the image and the environmental condition, and determining a delivery destination for the food product based at least in part on the evaluation of the food product.

Other aspects and advantages of the present invention will become apparent from the following detailed description, which, when taken in conjunction with the drawings, illustrate by way of example the principles of the invention.

DETAILED DESCRIPTION

Figure 1:
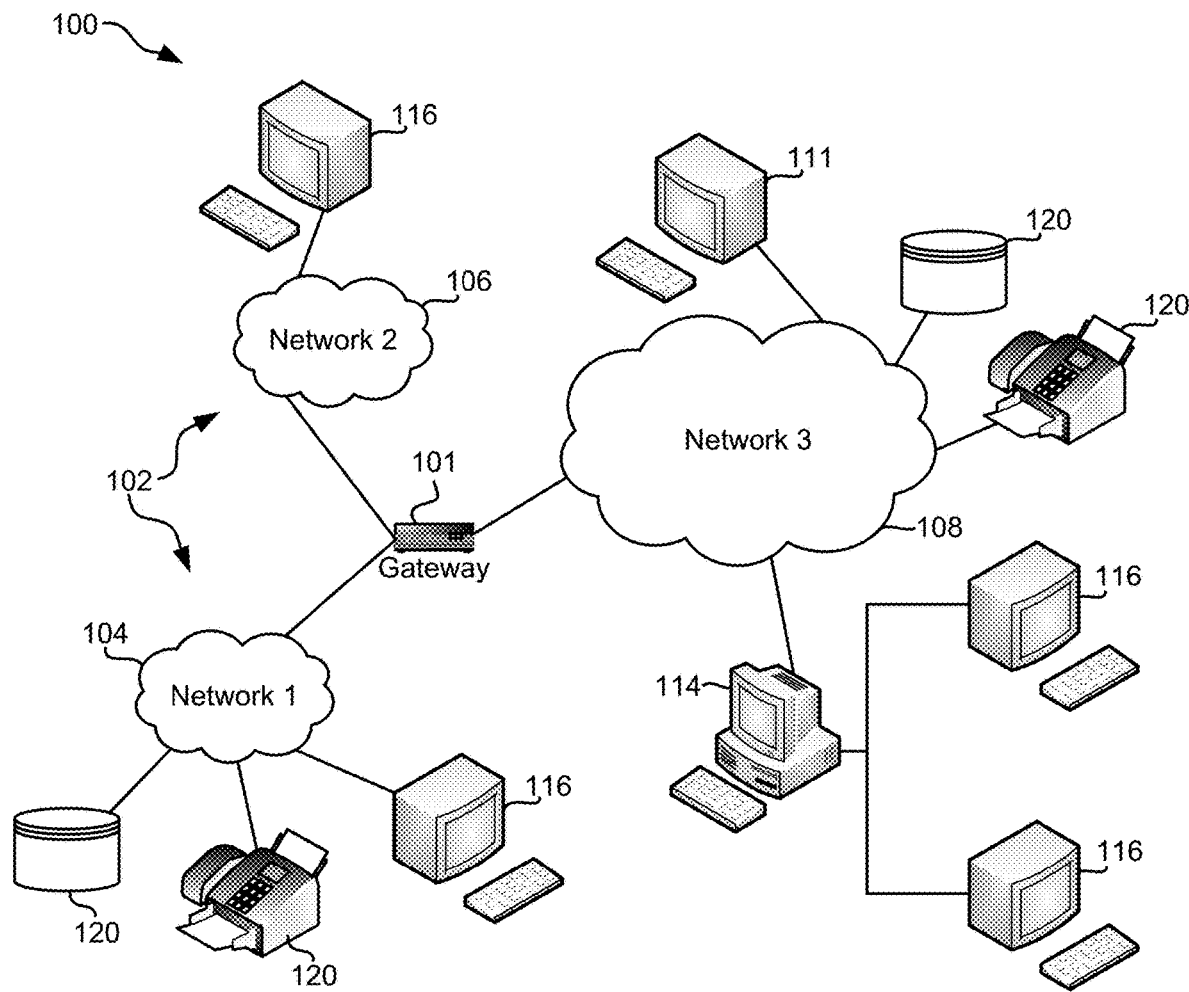
FIG. 1 is a diagram of a network architecture in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of using photo analytics to evaluate the state of a product, as well as related systems, products and methods.

In one general embodiment, an article of manufacture includes an objective reference having at least two optical references. The optical references are selected from a group consisting of: a non-human-visible mark, a ruler, a spaced grid, a color calibration area, an area of reflectivity, a texture, and a pattern.

In another general embodiment, a method includes receiving an image of a product and an objective reference having at least two optical references. The optical references are selected from a group consisting of: a non-human-visible mark, a ruler, a spaced grid, a color calibration area, an area of reflectivity, a texture, and a pattern. The product is evaluated by comparing the product in the image to the optical references in the image.

In yet another general embodiment, a computer program product includes a non-transitory computer readable storage medium having program instructions thereon for causing a computer to perform the foregoing method.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

FIG. 1 illustrates an architecture 100, in accordance with one embodiment. As an option, the present architecture 100 may be implemented in conjunction with features from any other embodiment listed herein, such as those described with reference to the other FIGS. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
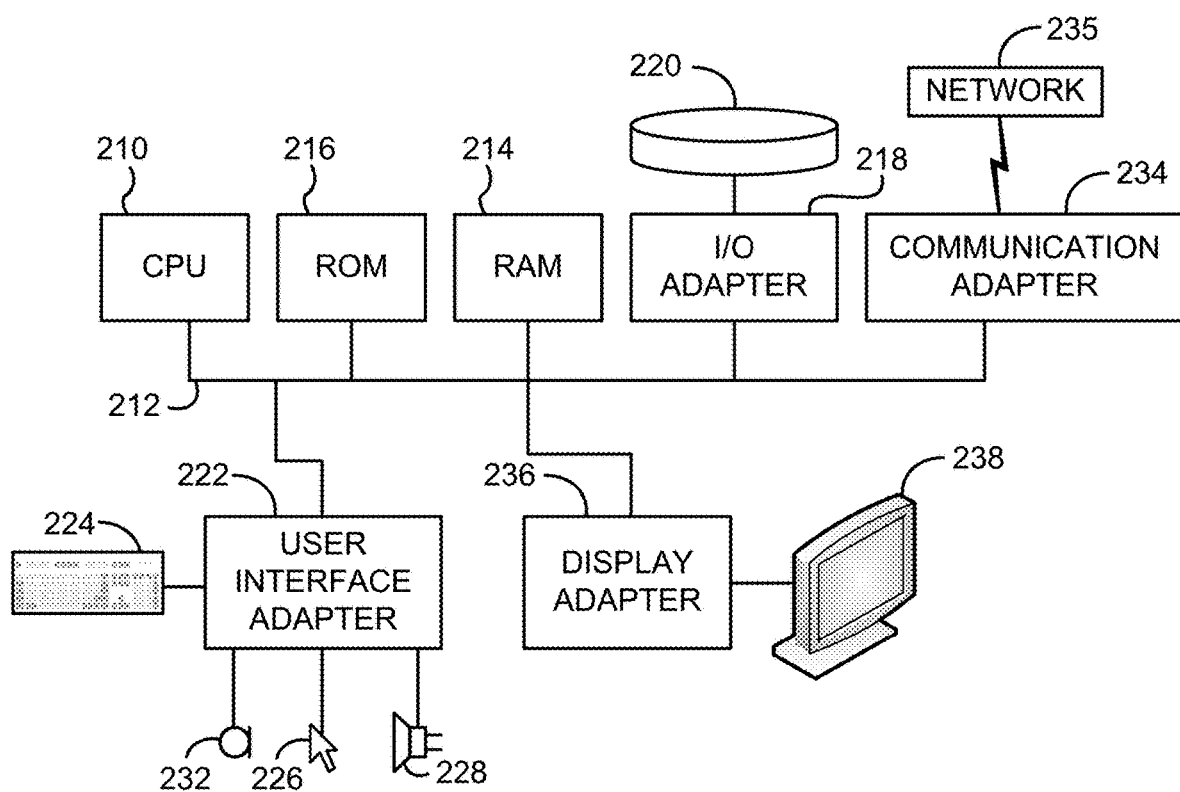
FIG. 2 is a depiction of a representative hardware environment associated with a user device and/or server of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Various embodiments presented herein enable use of an objective reference to allow evaluation of a product via an image of the product with the objective reference. In one approach, each image taken would contain the objective reference, which may then be used by the analytic interpretation program as a baseline when evaluating the image of the product.

Embodiments are usable with any type of product, such as perishable products (e.g., food items, plants, etc.); colored objects such as clothing; products susceptible to damage such as cardboard boxes proceeding through a supply chain; etc.

Particularly preferred embodiments of the present invention provide an objective reference tailored for use with a food product, and further provide a way to standardize the image capture of the food product, such that consistent and accurate image or photo analytics can be used to evaluate the food product.

In some approaches, the objective reference may be a permanent fixture, e.g., mounted to a surface, painted or printed on a fixed surface, etc. However, in other approaches, the objective reference may be portable, disposable, on a movable object such as a tray, etc. To provide a context for the objective reference, and done by way of example only and without limitation, some of the description herein will refer to an objective reference as a "calibration card," but this is meant in no way to limit the type of objective reference, material used, size of objective reference, or any other physical characteristics of the objective reference.

In various embodiments, the objective reference may be, or be on, a sheet of paper, a card, a laminate, a tray, or any such printed media.

The objective reference may include at least one optical reference, and preferably at least two optical references, that enables some characterization of the product to be evaluated via an image of the product along with the objective reference. In one embodiment, an objective reference is provided to aid in the image or photo analytics used to interpret images captured of food product for the purpose of food product inspection, quality determination and shelf life prediction.

The objective reference preferably includes two or more optical references (to the camera, which may include image capture not visual to a human, such as, but not limited to, infrared or ultra violet light wavelengths). Optical references may include, but are not limited to: optical calibration marks, a ruler, a regularly spaced grid, an irregularly spaced grid, a color calibration area that may include standard or specialty colors printed with color accuracy (possible a number of varying colors, such a red, yellow, blue and shades of grey ranging from white to black), a calibrated amount of reflectivity, constant or varying texture patterns.

The objective reference may also include non-human-visible marks for purposes such as calibration and/or authentication of the objective reference itself. In some approaches, the non-human-visible marks may be used to verify that the image data collected is of verifiable quality, and perhaps even evidentiary in nature, via authentication of the objective reference, which in turn provides a benchmark for the image data. Thus, the quality of the image data having an authenticated objective reference therein may be raised to evidentiary status, even if taken with an uncalibrated camera. Without the objective reference, or with an unverified objective reference, it could be argued there was enough possible "distortion" of color, textures, etc. that the image data may be inaccurate. Illustrative non-human-visible marks may include marks that respond to infrared or ultraviolet light in a manner that can be captured by the camera, but not visible or obvious to a person.

Further, the objective reference may include other information such as date, time, location, person or persons (including company name) involved in capturing the image, food product reference number (such as product ID, GTIN, or PTI number or some standardized reference to product type, producing company, etc.), temperature, humidity, or other current environmental conditions, such that they accurately and objectively are captured within the image. An identifier such as a serial number, product identifier, etc. may also be present.

The objective reference may provide a baseline references for calibration related to some or all relevant optical data, as well as optionally food product and environmental data, to enable the most complete image or photo analysis possible, solely based on the image data captured.

Turning to an example, visual inspection of food products is used to help characterize the food product physically, as well as gauge its freshness or ripeness. Some potential physical characteristics of the food product or parts of the food product include, but are not limited to, size, shape, count per container, color, composition (such as with or without a stem), surface texture, reflectivity, transparency, and/or certain pattern types (such as the tightness of a weave pattern on melons). Visual inspection of food products for freshness or ripeness may look for characteristics such as, but not limited to, decay, bruising, separating of segments, discoloration different from fresh color, changed composition (such as wilting calyx or loss of stem or other component), changed surface texture, reflectivity, transparency, patterns, and/or other visual cues. A visual inspector trained in the art of food inspection can interpret both the physical and freshness characteristics, and determine if the food product meets certain criteria that can relate to either acceptance, possible qualified acceptance that may include a discounted price or some reduced value, possible qualified acceptance that requires special handling to expedite use or sale or assign a specific type of use or sale, possible rejection of the food product. Based on different types of inspection, possibly performed at either different times in the food product life cycle, which for these purposes include post-harvest distribution and sale, up through use or consumption, or different locations in the food distribution chain, the interpretation of results may vary as the expectation of the physical state may vary. However, for any given time or location, it is preferable to have objective and consistent analysis of the physical and visible characteristics. Further, the visual inspector observations need to be recorded in an unambiguous, and standardized format or language, such that uniform interpretation can be made based on reading or evaluating a visual inspection report. This is the challenge for the current visual inspections.

Figure 3:
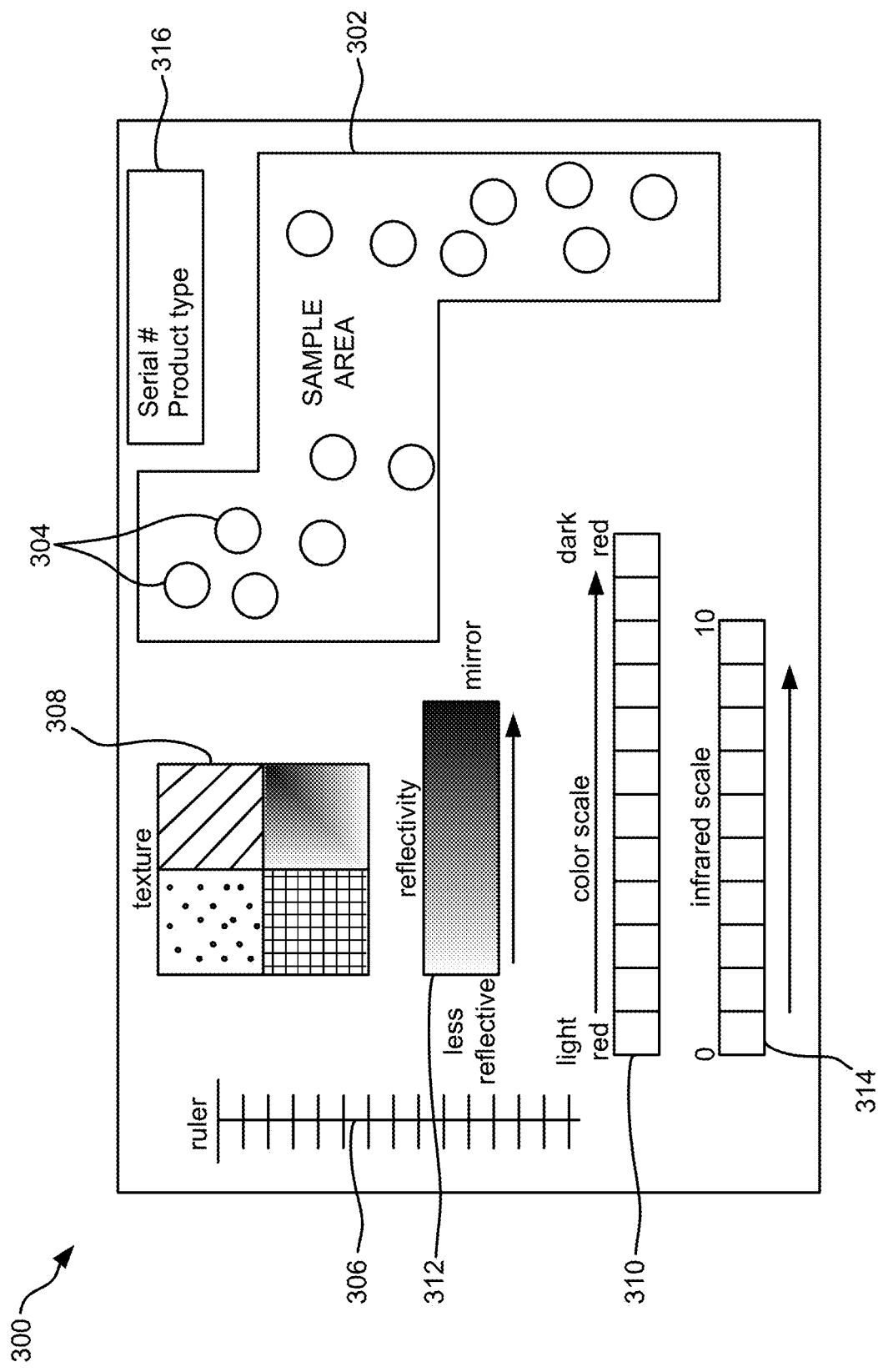
FIG. 3 is a depiction of a calibration card, in accordance with one embodiment.

FIG. 3 illustrates an illustrative calibration card 300 for use with strawberries, according to one embodiment. As shown, the calibration card 300 includes a sample area 302 for receiving the product, in this case, strawberries 304. For example, a handful or carton of strawberries may be placed in the sample area 302 in the field during picking, at a warehouse, at some point in the supply chain, at the final destination, etc.

Optical references on the calibration card include a ruler 306 in any suitable unit, e.g., centimeters, inches, etc. A texture reference 308 has textures for comparison to the texture of the strawberries 304 placed on the sample area 302.

A color calibration area 310 having color patches varying from light red to dark red is provided to assist in grading the color of the strawberries 304. For example, the color patches may correspond to the color range of the strawberries. Because the hues of the color patches are known and/or standardized, it does not matter how the color appears in the image; the relative color of the strawberries can readily be determined. The ripeness of the strawberries may be determinable based on the relative color thereof.

A further application of the color calibration area 310 may be to allow accurate detection of a color resulting from contact of the product with a substance. For example, the color of a catalyst, reactant, color-changing substance, etc. placed in contact with the product, and/or color of the product upon being contacted by a substance. In one approach, a dye that changes color in the presence of a contaminant may be placed in contact with the product, such as by being applied to the product, by being present in the sample area of the calibration card 300, etc. As an example, the resulting color of a dye applied to the product may indicate presence of e coli, may provide a visual indication of sweetness, may indicate some other characteristic, etc. The color calibration area 310 enables an accurate evaluation of the change in color via image data.

In some approaches, non-human-visible marks may be used to verify that the image data collected is of verifiable quality, and perhaps even evidentiary in nature, even if taken with an uncalibrated camera. Without the calibration card, it could be argued there was enough possible "distortion" of color, textures, etc. that the reading may be a false reading.

A reflective area 312 may be present. As shown, the reflective area 312 transitions therealong from less to more reflectivity, e.g., almost no reflectivity to mirror-like reflectivity. For example, the reflective area 312 may be used to determine the sheen of the strawberries, which may be indicative of moisture content of the strawberries.

An infrared scale 314 is also shown for enabling comparison thereof relative to infrared image data of the strawberries 304. This is useful, for example, for such things as detecting a temperature of the product at the time of the image, whether the product is heat stressed, whether the product is spoiling, etc. For example, variations in the infrared image data indicate problems such as decay and bruising, even when such problems are not readily detectable in the visible spectrum image data.

Identification information 316 may also be present, e.g., to identify the grower, the location of the image capture, etc.

A count of the strawberries in the image may also be made. Preferably, the sample area is of a size configured to receive a standard container volume of the strawberries, e.g., the sample area fits one clamshell worth of strawberries, where the clamshell is the standard size typically sold in a grocery store. The average size of the strawberries may be estimated from the count, or an approximate number of strawberries per clamshell may be determined.

A calibration card preferably has optical references particular to the type of product it is intended to be used with. For example, blueberries may have a blue color scale, while lettuce may have a green color scale and textures particular to lettuce.

Various embodiments may be useable to assess an inside component of the product, e.g., the inside of a melon. Accordingly, optical references particular to an internal component of the product may be present. For example, using a watermelon as an example, images of the outside of the watermelon may be taken with a calibration card having optical references corresponding to the rind. The watermelon may also be cut to create a slice. The slice may be placed on the sample area of the same calibration card, or another calibration card. The optical references may include textures corresponding to the texture of the pink flesh, seeds, etc. The color reference may extend from pale pink to deep red.

To further aid in capturing consistent image quality and for assessing product condition, the product and objective reference may optionally be illuminated with a light source to provide uniform lighting conditions and/or additional wavelengths of light, including but not limited to infrared, ultraviolet light and/or laser imaging. Any conventional light source or set of light sources may be used.

The objective reference may also include a holographic calibration object, that may provide both authentication and further calibration for the image. The hologram may add additional information regarding the angle of the image capture relative to the product.

In use, one or more still and/or video images may be captured using an image capture device, e.g., a portable telephone, a fixed or portable camera, a camera above a conveyor belt, etc. An image may be captured any time, e.g., when a scout is in the field selecting samples to determine when to pick the fruit, upon packaging, in transit, and/or at the final destination.

The captured image data may be stored for later use, analyzed by computer and/or a human for assessing the condition of the product, etc. Because the characteristics of the optical references are known, information about the product becomes standardized, regardless of the device used to capture the image data.

Photo analytics may be used to interpret images captured of a food product for the purpose of food product inspection, quality determination and shelf life prediction. Such food products may be fruit, produce, meat, seafood, prepared foods, etc. Results of the analysis may be stored, sent to a party associated with the product (e.g., grower, vendor, transporter, etc.), etc.

Multiple images of the product taken along the supply chain may be assessed, and compared to determine relative changes in the product as it traverses the supply chain. The product may travel with the objective reference. However, where copies of the objective references are used at the various points of the supply chain, where such copies are identical, an accurate comparison of the same product at different times can be made. For example, the relative change in characteristics of the product from one point to another along the supply chain can be accurately determined.

The assessment may also be used to route the product to a particular destination based on its characteristics. For example, strawberries having a lighter shade of red may indicate having been harvested early, and therefore may be routed to a more distant destination because they will have a longer shelf life than strawberries harvested late, as evidenced by a deeper red color. Similarly, salmon exhibiting separation between fat and protein, as detectable by comparison to a texture of the objective reference, may indicate that the salmon is past its ideal freshness, and so should be routed to a destination for faster sale. Moreover, strawberry samples exhibiting a smaller size may be routed to destinations requesting smaller strawberries, and vice versa.

The image assessment information may be used in conjunction with other information, such as transit time, an environmental condition near the product in transit, etc. Such information may be acquired at any point or points as the product moves through the supply chain. Various illustrative environmental conditions that may be monitored, assessed and/or considered may include one or more of humidity, pH levels, temperature, sunlight, ultraviolet light, chemicals, radioactivity, pathogens, presence of bacteria, presence of viruses, presence of prions, carbon dioxide level, etc., or any other data which would be desired and/or apparent to one skilled in the art upon reading the present description. In other embodiments, the various attributes may include any information on environmental characteristic that may affect the shelf life or expiration of the good being monitored.

Preferably, the environmental condition is measured in the immediate vicinity of the product, e.g., by a sensor tag configured to provide data about the environmental condition.

The image assessment information may be used as proof for an insurance claim and/or return of the product.

In one approach, the resulting image data and/or analysis results thereof may be uploaded to a supply chain management system. The management system may take a predefined action based on the analysis of the image data. For example, the management system may send updates to other applications that may be used to dispatch the driver to a customer, or complete a sales transaction with a customer. The management system may maintain a product freshness metric that tracks the product from ideal freshness to disqualification, which can be determined based at least in part on the image data analysis. Based on this metric, the dispatch application may select the best choice for delivery from two or more delivery items qualified for delivery. By selecting the container with the lower freshness metric for delivery to a closer location, for example, the dispatch application may maintain an inventory of food with a higher freshness metric.

The management system may also send updates, pushes based on events, based on the product in the delivery container being appropriate for sale. If the management system determines the product has been disqualified, possibly due to picking too early or too late, the management system may notify the sales transaction application to remove the product in the specific delivery container from availability. There may also be user input to disqualify one or more delivery container contents, such as in a recall. This enables immediate action to prevent further sales of product for any reason. The management system may optionally notify other applications or users of this disqualification status, for instance the management system notifies the driver of the product disqualification and requests they acknowledge and return the product to the supplier for proper disposal.

The management system preferably stores all of the data associated with each shift and delivery container. This data can be used to analyze the performance of the entities involved in each delivery, and report accordingly. For instance, data could show that specific drivers consistently mishandle the food, or that a particular grower tends to pick the food too early. These types of analytical reports can help improve the food delivery over time. The data can also be used for health department or other food safety reports, to reflect that proper process that maintains food quality and safety is being adhered to on a consistent basis.

Another challenge in capturing images fully representing food product is that the food products are three dimensional, but the image capture is currently only two dimensional, capturing only a view from a single side of the food product. For a complete visual inspection, it would be best to capture images from all views or sides of the food product. While this may be accomplished by randomly moving the food product, such as by shaking a tray containing the food product, a means or device that more consistently captures all views may be preferred. To accomplish this task, another embodiment may employ use of a type of flexible mesh screen, ideally with optically transparent mesh, that may elastically hold the food product from both sides, without deforming, injuring or physically changing the food product. A mesh screen may allow the food product to remain in a fixed position relative to the frame, and then an image could be taken from two sides. The mesh screen may be utilized in combination with the calibration card, such that the calibration items were incorporated in the frame of the device, and visible from both sides.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method for routing food products using images of the food products, the method comprising:

receiving images of food products, wherein each image comprises the same type of food product as the other images and an objective reference therein, the objective reference in each image being an article of manufacture having at least two optical references, wherein the food product in each image is spatially separated from the optical reference in the image such that the food product does not obstruct the optical references in the image, wherein the objective reference in each image comprises a sample area having the food product thereon, the sample area being spatially separated from the at least two optical references, wherein the sample area is positioned relative to the optical references such that the food product on the sample area does not obstruct the view of the optical references in the image;

receiving an environmental condition on or near each of the food products;

evaluating each of the food products using the images and the environmental condition;

determining a freshness metric for each of the food products based at least in part on the evaluation; and determining a delivery destination for each of the food products based at least in part on the freshness metric for each of the food products, wherein determining the delivery destination includes determining a prioritized delivery scheme, wherein a food product having a lower freshness metric is prioritized for delivery to a closer delivery destination, wherein a food product having a higher freshness metric is prioritized for delivery to a farther delivery destination.

2. The method of claim 1, comprising receiving a second image of each of the food products taken at a different time in a life cycle of the food products, and comparing the images with the second images for determining a relative change in a characteristic of each of the food products.

3. The method of claim 2, comprising re-evaluating the food products based on the relative change in the characteristic of each of the food products, along with related environmental condition data, and performing an action selected from the group consisting of: validating a current delivery destination and selecting a different delivery destination for each of the food products based on the re-evaluation of the food products.

4. The method of claim 3, comprising interpreting results of the re-evaluating in a different manner than the way the results of the earlier evaluations were interpreted.

5. The method of claim 1, wherein evaluating the food products includes considering a transit time of each of the food products.

6. The method of claim 1, wherein evaluating the food products includes gauging freshness, or remaining useful life of the food products by analyzing the images for bruising, breakage or the results from other mishandling of the food products.

7. The method of claim 1, wherein evaluating the food products includes gauging freshness of the food products by analyzing the images for decay and/or other visible indications of reduced remaining useful life of the food products.

8. The method of claim 7, wherein evaluating the food products includes gauging freshness of the food products by analyzing the images for detecting a color change of the food products.

9. The method of claim 1, wherein evaluating the food products includes counting a number of pieces of the food product in the images.

10. The method of claim 1, wherein evaluating the food products includes assessing an image of an inside component of each of the food products.

11. The method of claim 1, wherein the images are received from a mobile device with an image capture device, including a portable telephone.

12. The method of claim 1, wherein the images are received from a camera positioned above a conveyor belt.

13. The method of claim 1, comprising using a result of the evaluating as proof for an insurance claim.

14. The method of claim 1, wherein the objective reference includes a calibration area for calibrating color and/or another image component.

15. The method of claim 1, wherein the objective reference includes a color calibration area for calibrating color, wherein the evaluating includes detecting a color resulting from contact of the food products with a substance and comparing the color to the color calibration area.

16. The method of claim 1, wherein the objective reference includes a non-human-visible mark, and comprising authenticating the objective reference using the non-human-visible mark.

17. The method of claim 1, wherein the objective reference includes a texture, wherein the texture corresponds to a texture of the food products.

18. The method of claim 1, wherein the objective reference includes identification of a grower of the food products.

* * * * *